(12) United States Patent
Severinsson et al.

(10) Patent No.: US 7,299,899 B2
(45) Date of Patent: Nov. 27, 2007

(54) DIGITAL SENSOR

(75) Inventors: Lars Severinsson, Hishult (SE);
Anders Persson, Amundstorp (SE);
Luis Tormo, Landskrona (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/670,438

(22) Filed: Sep. 25, 2003

(65) Prior Publication Data

US 2005/0189182 A1   Sep. 1, 2005

Related U.S. Application Data

(63) Continuation of application No. PCT/SE03/00166, filed on Jan. 31, 2003.

(30) Foreign Application Priority Data

Feb. 6, 2002  (SE)  .................................... 0200330
Feb. 28, 2002 (SE)  .................................... 0200591

(51) Int. Cl.
*F16D 66/02* (2006.01)
(52) U.S. Cl. ................................................. 188/1.11 L
(58) Field of Classification Search ........... 188/1.11 R, 188/1.11 W, 1.11 L, 71.8–71.9; 192/30 W; 116/208; 340/454; 324/207.2, 207.5, 207.23, 324/207.24, 207.25
See application file for complete search history.

(56) References Cited

U.S. PATENT DOCUMENTS

| | | | | |
|---|---|---|---|---|
| 4,934,474 A | * | 6/1990 | Sugasawa | .................... 180/414 |
| 4,992,944 A | * | 2/1991 | Noto et al. | .................... 701/41 |
| 6,105,730 A | * | 8/2000 | Ekeroth | .................. 188/1.11 L |
| 6,129,183 A | * | 10/2000 | Ward | ...................... 188/1.11 L |
| 6,246,232 B1 | * | 6/2001 | Okumura | .................. 324/207.2 |
| 6,276,494 B1 | * | 8/2001 | Ward et al. | ............ 188/1.11 W |
| 6,552,533 B2 | * | 4/2003 | Schodlbauer et al. | .. 324/207.22 |

FOREIGN PATENT DOCUMENTS

| | | | |
|---|---|---|---|
| DE | 42 30 831 A1 | | 3/1994 |
| DE | 196 37 406 A1 | | 3/1998 |
| EP | 0 460 378 A2 | | 12/1991 |
| GB | 2258704 | * | 2/1993 |
| WO | WO 96/41970 | | 12/1996 |
| WO | WO 97/29298 | | 8/1997 |
| WO | WO 03/067115 A1 | * | 8/2003 |

* cited by examiner

*Primary Examiner*—Bradley King
(74) *Attorney, Agent, or Firm*—St. Onge Steward Johnston & Reens LLC (57) ABSTRACT

The present invention concerns a digital sensor for monitoring the wear of lining material of a disc brake. The sensor is to be attached to the end of an adjusting shaft of an adjusting mechanism, which mechanism is used for adjusting the position of brake pads in relation to the brake disc. The sensor has two or more code parts of which one is rotated continuously by rotation of the adjustment shaft. The code parts have paths of codes to be read by detectors placed on a PCB. The PCB has circuitry to relate the position of the sensor to the wear of the lining material.

16 Claims, 6 Drawing Sheets

DIGITAL SENSOR

This application is a continuation of pending International Patent Application No. PCT/SE03/00166 filed on Jan. 31, 2003, which designates the United States and claims priority of pending Swedish Application Nos. 0200330-9 filed on Feb. 6, 2002 and 0200591-6 filed on Feb. 28, 2002.

FIELD OF THE INVENTION

The present invention refers to a digital sensor for monitoring the wear of lining material of a disc brake. The invention is primarily developed for disc brakes for heavy duty road vehicles, but a person skilled in the art realizes that it may be used for any kind of vehicle. The sensor element is intended for use at both pneumatically and electromechanically actuated brakes.

PRIOR ART

Digital sensors transform a continuously varying value to a quantified value. Many digital sensors use different types of codes, by which the measured value is represented by a certain code. The codes may be given in many different ways, e.g. by different light or dark parts, or by holes or no holes, which are read by an optical sensor. The codes may also be given by the presence or no presence of magnets, the direction of a magnetic field etc. read by any type of magnetic sensor, e.g. a hall effect sensor or a magnetoresistive sensor.

Several different types of indicators or sensors for monitoring the wear of the brake lining of a brake pad or the like are known. In principal the known sensors operate in two different ways for monitoring wear of brake linings. The first way is to use a sensor that measures directly on the brake lining. The second way is to use a sensor that monitors the position or movement of a part indicative of the wear of the brake linings. The present invention concerns a sensor element monitoring the position of a part, indicative of the wear of the brake linings.

Disc brakes are generally of two different types, which are referred to as disc brakes having a fixed caliper or a floating caliper. The present invention is applicable for both the above types of disc brakes.

The sensor according to the present invention is to be applied to the end of an adjustment shaft. The adjustment shaft is a part of an adjustment mechanism, used to control the position of the brake pads in relation to the brake disc(s), as is well known in the art. As the lining of the brake pads wear off, the position of the brake pads in relation to the brake disc(s) is automatically adjusted, by means of the adjustment mechanism. Hereby the distance between the lining material and the brake disc(s) is kept more or less constant. The amount of rotation of the adjustment shaft is correlated to the distance the adjuster mechanism advances the brake pads towards the brake disc(s). Thus, the rotation of the adjustment shaft is an indicator of the wear of the brake pads of the disc brake.

When worn brake pads are to be replaced by new brake pads, the adjustment mechanism, and thus, the adjustment shaft, is brought back to a starting position. This is done to give room for the new thicker brake pads.

SUMMARY OF THE INVENTION

One object of the present invention is that the sensor should be relatively compact.

Another object of the present invention is that the sensor should be relatively easy to mount at different types and makes of brakes. It should also be possible to retrofit on brakes already mounted in vehicles.

A further object is that the sensor shall be relatively cheap to produce. Furthermore, the sensor should preferably be placed in a position in which the high temperatures generated during braking will have minimal effect on the sensor.

The above objects are met by a digital sensor for monitoring the wear of the lining material of disc brakes. The sensor is to be attached at the end of an adjustment shaft of an adjusting mechanism for adjusting the position of brake pads in relation to the brake disc. The sensor comprises at least two code parts. One code part is rotated continuously by rotation of the adjustment shaft. The code part rotating continuously is a code wheel. The other parts are one or more sliding parts in the form of a code rack, a sleeve etc. which is moved in a linear fashion and/or one or more code wheels.

As the digital sensor of the present invention is to be placed at the end of the adjustment shaft, it is easy to adapt it to existing brakes and to mount it on brakes already mounted in a vehicle.

Due to the position of the digital sensor it is readily available for service and other maintenance. Furthermore, it is placed at a relatively large distance from the high temperatures generated during braking. The high temperatures are generated in the contact between the brake pads and the brake disc(s). Thus, it is less risk of malfunction due to excessive temperatures. Digital sensors are generally less sensitive to different disturbances, such as variations of temperature, pressure etc. than other types of sensors. Furthermore, the sensor has minimal effect on the adjustment mechanism, as the movement of the code parts is given without any excessive force needed.

The sensor of the present invention is possible to use with any disc brake having an accessible adjustment shaft. As the exact design of the disc brake as such is of no importance for the present invention it will not be described here. However, the sensor element of the present invention is mainly intended for pneumatically or electromechanically actuated disc brakes.

Further objects and advantages with the present invention will become apparent for a person skilled in the art, when reading the detailed description below of presently preferred embodiments of the invention.

BRIEF DESCRIPTION OF THE DRAWINGS

The invention will be described more closely below by way of examples and with reference to the enclosed drawings. In the drawings.

DETAILED DESCRIPTION OF PREFERRED EMBODIMENTS

Figure 1:
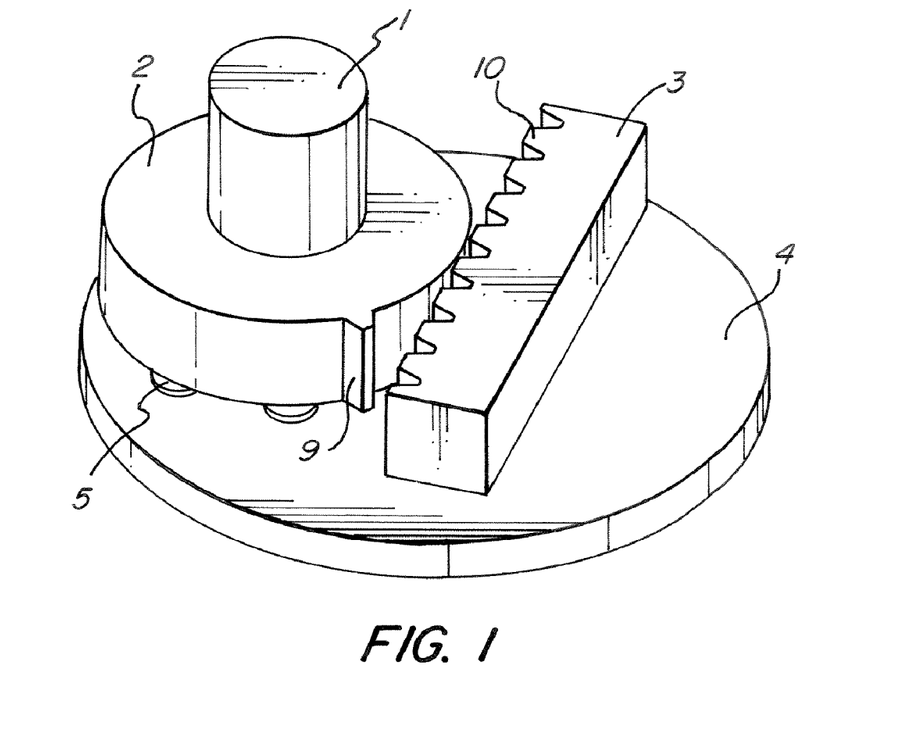
FIG. 1 is a schematic view of a first sensor according to the present invention.
Figure 2:
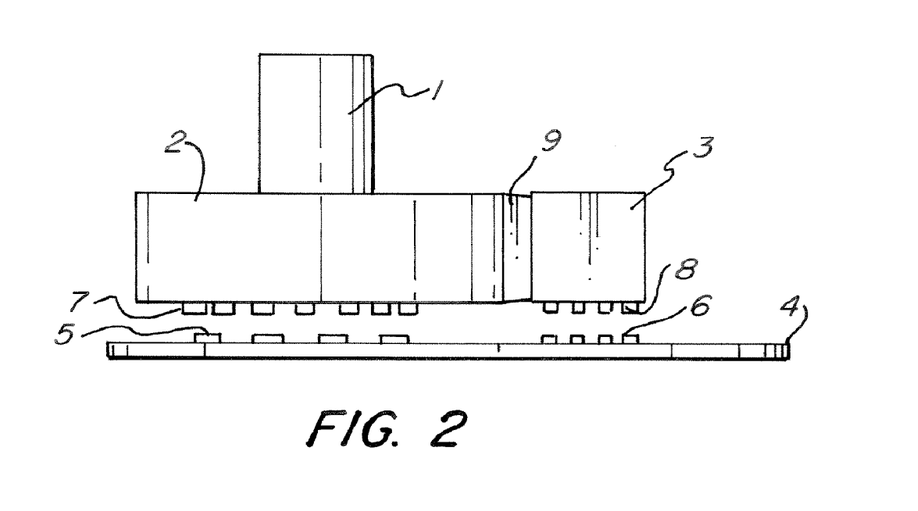
FIG. 2 is a side view of the sensor of FIG. 1.

The sensor element of the present invention as shown in FIGS. 1 and 2 consists of a code wheel or disc 2 and a code rack 3. The code rack 3 is used to count the number of turns of the adjustment shaft and the code wheel 2 is used to determine the position on the actual turn.

The elements of the digital sensor are normally placed in a housing, which housing is omitted from the FIGS. 1 and 2 for clarity reasons.

The sensor element of the present invention is to be placed at the end of an adjustment shaft (not shown) of a disc brake. In the embodiment of FIG. 1 a connection part 1 is used for connection to the adjustment shaft. The form of the connection part 1 is adapted to the form of the end of the actual adjustment shaft and may be formed to be received in a recess at the end of the adjustment shaft. A person skilled in the art realises that the connection part of the sensor element may have many different forms, depending on the form of the shaft. The connection part may e.g. have the form of a nut, a cap or the like placed over the end of the adjustment shaft. In many brakes the adjustment shaft is drivingly connected to a further shaft (not shown), which further shaft may be used to reset the adjustment mechanism.

In the embodiment of FIGS. 1 and 2 a code wheel 2 and a code rack 3 are placed facing a PCB (printed circuit board) 4. The code wheel 2 is fixed to the adjustment shaft of the disc brake by means of the connection part 1. As the code wheel 2 is fixed to the adjustment shaft, it will rotate as the adjustment shaft rotates. The PCB 4 is supported in a fixed way and, thus, will not rotate. A person skilled in the art realises that the PCB 4 may be supported in many different ways. The code rack 3 will move one step for each turn of the adjustment shaft or code wheel 2. Different examples of how to accomplish this are described below.

On the side of the PCB 4 facing the code wheel 2 and the rack 3, there are a number of detectors 5, 6. In the shown embodiment there are four detectors 5, 6 for each of the wheel 2 and rack 3, respectively. The number of detectors 5, 6 is decisive for the accuracy of the measurements. A person skilled in the art realises that the number of detectors may vary and that the number of detectors 5, 6 are related to the number of paths of codes on the code wheel 2 and the code rack 3, respectively. The codes on the code wheel 2 and rack 3 are of binary type.

The code wheel 2 has a number of circular paths, where each path is placed in a position relating to one detector 5, placed on the PCB 4. The code rack 3 has a number of linear paths in positions related to detectors 6, placed on the PCB 4. A person skilled in the art realizes that many different types of codes may be used. The code may be a so-called Graycode, i.e. only one bit position changes its value between two adjacent numerical values. The paths may be formed of a number varying areas, e.g. every second area is dark the other light, every second area is a hole the other no hole or every second area is a magnet and the other no magnet etc. An embodiment using magnets will be discussed below. The numbers of areas in each path varies, in order to form different binary numbers when the detectors read the actual value in the area placed opposite each detector. This is known to a person skilled in the art and will not be further discussed here.

As stated above the codes may be alternating dark and light areas detectable by means of the detectors 5, 6, if they are of optical type. It is also possible to use holes or no holes, which is also detectable by means of optical detectors. If necessary a light may be placed on the opposite side of the code wheel 2 and rack 3 when the codes are of the type holes or no holes. The optical detectors as such are known to persons skilled in the art and will not be further discussed here.

The detectors 5, 6 are preferably placed on the PCB 4. The PCB 4 has circuitry to calculate the actual wear of the lining material of the brake pads based on the signals received from the detectors 5, 6. The signals from the detectors 5, 6 are related to the rotation of the adjustment shaft of the disc brake. The information from the PCB 4, regarding wear of the brake pads is normally given to the driver by means of the existing electronics of the vehicle. The information of the wear may be used both to give a warning to the driver that the thickness of the lining material is becoming hazardously low and to indicate the estimated driving distance before the next brake pad change.

As stated above, in an alternative embodiment the codes are given by magnets 7, 8 placed in paths on the sides of the code wheel 2 and code rack 3 facing the PCB 4. The magnets 7, 8 are placed in circular paths on the code wheel 2 and linear paths on the code rack 3. In this case the detectors 5, 6 of the PCB 4 are magnetic sensors facing the code wheel 2 and rack 3, respectively. The magnetic sensors, which may be hall effect sensors or magnetoresistive sensors, detects the position of the magnets 7, 8. The number of paths of magnets 7, 8 corresponds to the number of sensors. In the same way as stated above the PCB 4 has circuitry to process the received information from the sensors and present a value of the wear of the brake pads of the disc brake.

In FIG. 1 one example of transfer of the rotation of the code wheel 2 to the rack 3 is indicated. As stated above the code wheel 2 will rotate with the adjustment shaft. The code rack 3 is drivingly connected to a finger 9 on the outer circumference of the wheel 2. The finger 16 of the code wheel 2 is co-operating with teeth 10 on one side of the code rack 3. When the adjustment shaft and thus, the code wheel 2 rotates, the finger 9 of the code wheel 2 will move the code rack 3, as long as the finger 9 is in contact with a tooth 10 of the code rack 3. When the code wheel 2 continues to rotate the finger 9 will leave the contact with the teeth 10 of the rack 3 until the wheel 2 has rotated almost one turn. Then the finger 9 once again will go into contact with one tooth of the code rack 3. For each turn of the code wheel 2, and thus the adjustment shaft, the code rack 3 will be moved a length corresponding to one tooth. Thus, the rotational movement of the code wheel 2 will be transferred to a linear movement of the code rack 3. A person skilled in the art realises that any suitable means for transferring the circular movement of the wheel 2 to an intermittent movement of the rack 3 may be used. Furthermore, a person skilled in the art realises that the code wheel and rack may have designs that differ from the design of the embodiment shown in the enclosed FIGS. 1 and 2.

Below a number of further examples of digital sensors will be described in connection with the FIGS. 3 to 9. As the principles of the movements of the different sensor parts and the way the PCB operates is similar to what has been described above, in connection with FIGS. 1 and 2, it will not be repeated in full below.

Figure 3:
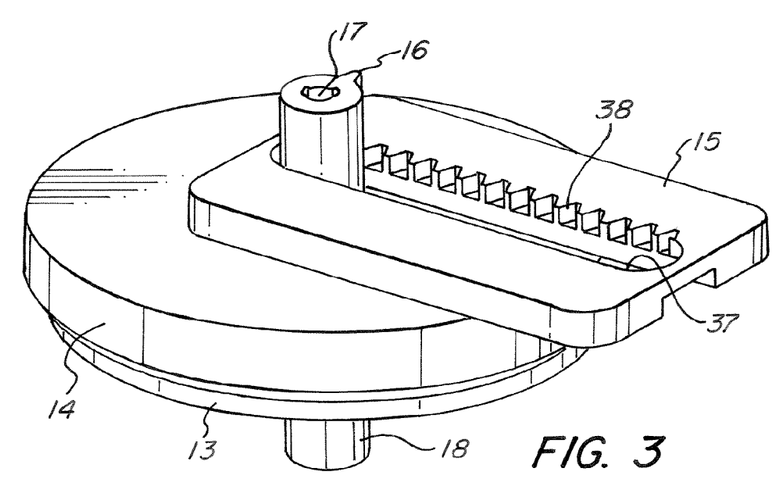
FIG. 3 is a schematic view of a second example of a sensor according to the present invention.

In the embodiment of FIG. 3 the sensor is attached to the adjustment shaft by means of a connection part 18. A code wheel 13 is fixed to the connection part 18 and will follow in the rotation of the connection part 18 and, thus, the adjustment shaft. In the same manner as described above the code wheel 13 has a number of paths of codes, on the side facing a PCB 14. The PCB 14 is fixed in such a way that the connection part 18 will rotate in relation to the PCB 14.

The connection part 18 extends above the PCB 14 and the extended part is received in a slot 37 of a sleeve 15. The sleeve 15 has the same function as the rack described for the previous embodiment. The extended part of the connection part 18 has a finger 16 for co-operation with teeth 38 arranged on one side of the slot 37 of the sleeve 15. The sleeve 15 is moved intermittently in its axial direction by the co-operation between the finger 16 and the teeth 38 of the sleeve 15. Thus, the sleeve 15 will be moved one step for each revolution of the connection part 18, and thus the adjustment shaft. Also the sleeve 15 has a number of paths of codes on the side facing the PCB 14.

In an alternative embodiment (not shown) the adjustment shaft is extended and replaces the connection part 18. In all other aspects this alternative embodiment corresponds to the above embodiment of FIG. 3.

In FIG. 3 a recess 17 for receiving a tool is shown. By means of said recess 17 and tool the adjustment mechanism may be returned to its original position after a change of brake pads. Thus, the adjustment mechanism may be returned to the starting position without disassemble of the digital sensor. In other embodiments there is no recess 17, but the adjustment mechanism is restored by means of a reset shaft, normally furnished.

Figure 4:
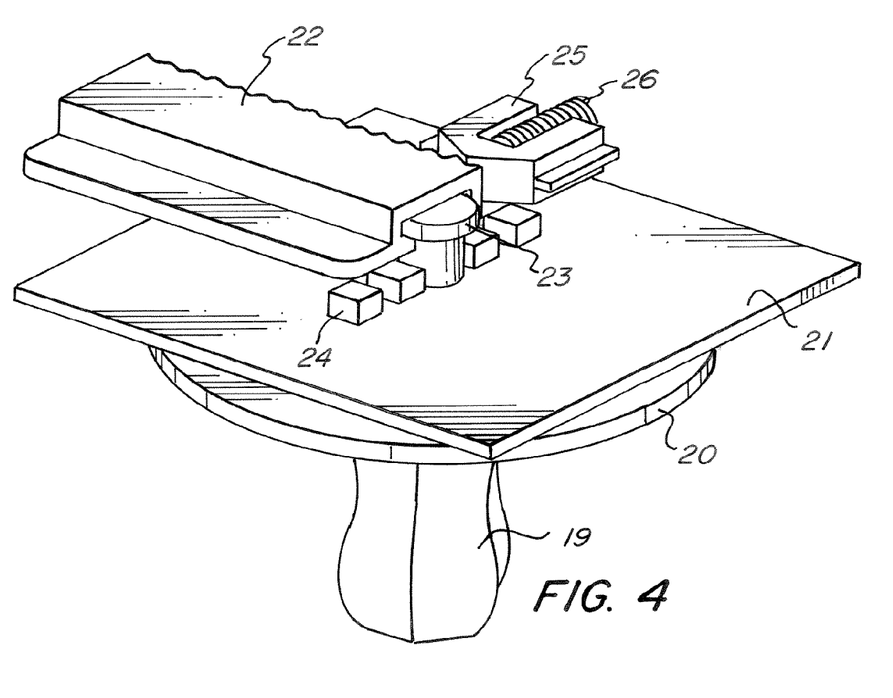
FIG. 4 is a schematic view of a further example of a sensor according to the present invention.
Figure 5:
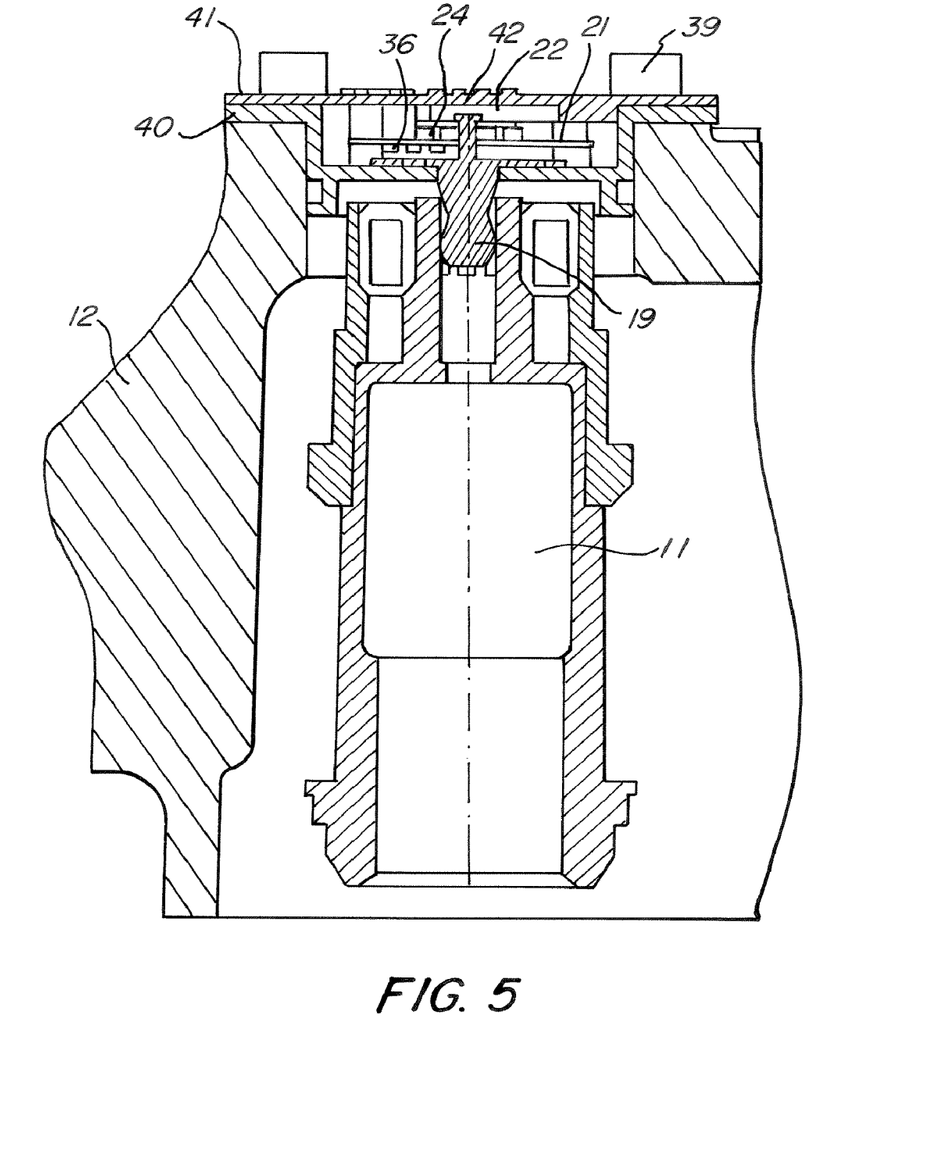
FIG. 5 is a sectional view showing the sensor of FIG. 4 mounted at an adjustment shaft of a disc brake.

The embodiment shown in FIGS. 4 and 5 resembles the previous embodiments in many ways. The sensor has a connection part 19 to be connected to the end of an adjustment shaft. Furthermore, a code wheel 20 is fixed to the connection part 19 in such a way that the code wheel 20 will follow in the rotation of the connection part 19. In the shown embodiment the code wheel 20 is integrated part with the connection part 19. On a side facing a PCB 21 the code wheel 20 has a number of paths of codes for co-operation with detectors 36.

An extension 42 of integrated code wheel 20 and connection part 19 is received in a slot of a sleeve 22. The sleeve 22 has a number of paths of codes facing detectors 24 on the PCB 21. At the end of the extension 42 a finger part 23 is arranged for co-operation with teeth at one side of the sleeve 22. The sleeve 22 will be moved intermittently one steep for each revolution of the connection part 19. On the outside of the toothed part of the sleeve 22 a clamp 25 is arranged, biased by means of a spring 26 towards the teeth of the sleeve 22. The clamp 25 is guided in a suitable recess of the housing 40 of the sensor. By means of co-operation between the clamp 25 and the sleeve 22 the intermittent movement of the sleeve 22 is controlled in an effective way.

In FIG. 5 the digital sensor of FIG. 4 is shown mounted at an adjustment shaft 11 of a disc brake. The caliper 12 of the disc brake is also shown. The sensor is received in a housing 40 placed in an opening of the caliper. A lid 41 covers the outer end of the housing 40, which housing 40 and lid 41 are fixed to the caliper 12 by means of screws 39. The connection part 19 of the sensor is received in a recess at the end of the adjustment shaft 11. Thus, the connection part 19 will rotate when the adjustment shaft 11 rotates.

The PCB 21 is fixed to the housing 40 and the extension 42 is received in an opening of the PCB 21. In the shown embodiment the PCB has four detectors 24 directed toward four paths of codes on the sleeve 22 and three detectors 36 directed towards three paths of codes on the code wheel 20.

Even though the assembly of the sensor of FIG. 4 is shown in FIG. 5 a person skilled in the art realises that all the different sensors described in this description may be assembled in a similar fashion. In which case the design of the housing and possible further parts is adapted to the actual sensor.

Figure 6:
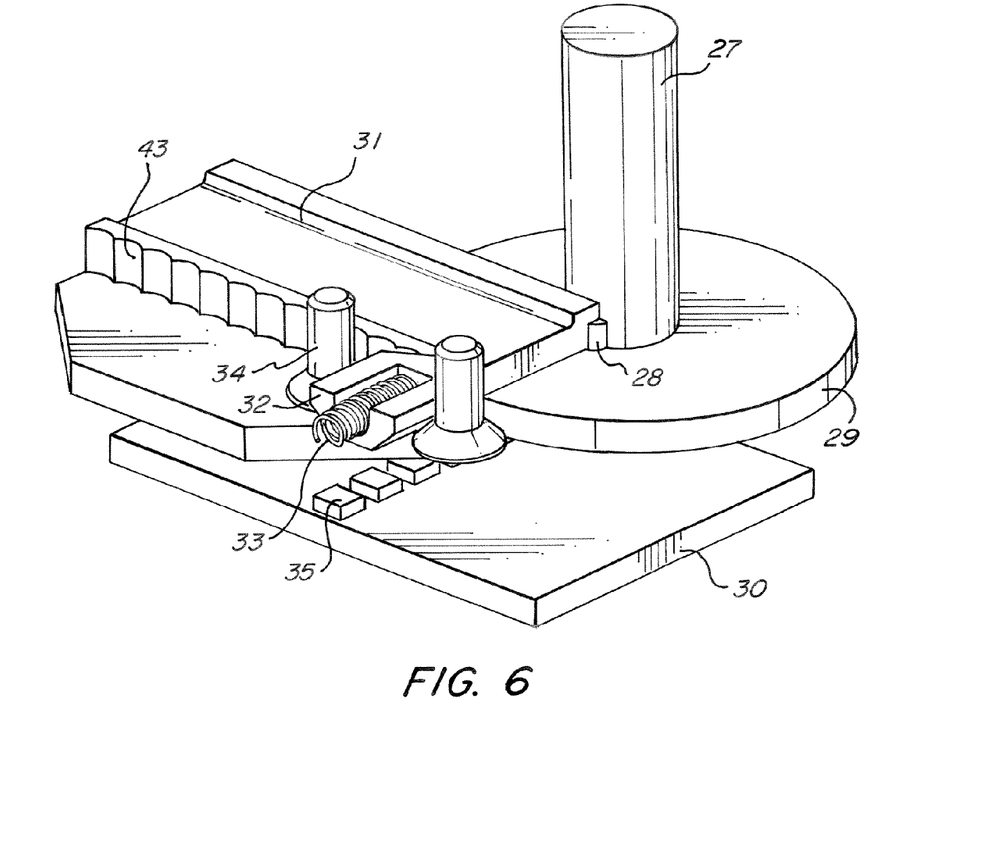
FIG. 6 is a schematic view of yet a further example of a sensor according to the present invention.

In FIG. 6 a further example of a sensor according to the present invention is shown. In this example a connection part 27 is to be connected to an adjustment mechanism. At the end of the connection part 27 a code wheel 29 is arranged, which code wheel 29 has a number of paths of codes (not shown) facing a PCB 30. Furthermore, a finger 28 is arranged at the junction between the connection part 27 and the code wheel 29, which finger is to co-operate with teeth (not shown) on a sliding part 31. The finger 28 will move the sliding part 31 intermittently one step for each revolution of the wheel 29. On the side facing the PCB 30 the sliding part 31 has a number of paths of codes co-operating with detectors 35 placed on the PCB 30.

A clamp 32 is arranged to slide over teeth 43 when the sliding part 31 moves. The clamp 32 is biased towards the teeth 43 by means of a spring 33. The clamp 32 is guided between two guide rolls 34.

A person skilled in the art realises that the different features of the shown embodiments may be varied in many different ways. Thus, it is e.g. possible to exchange parts of the example of FIG. 6 with parts of the example of FIG. 4.

Figure 7:
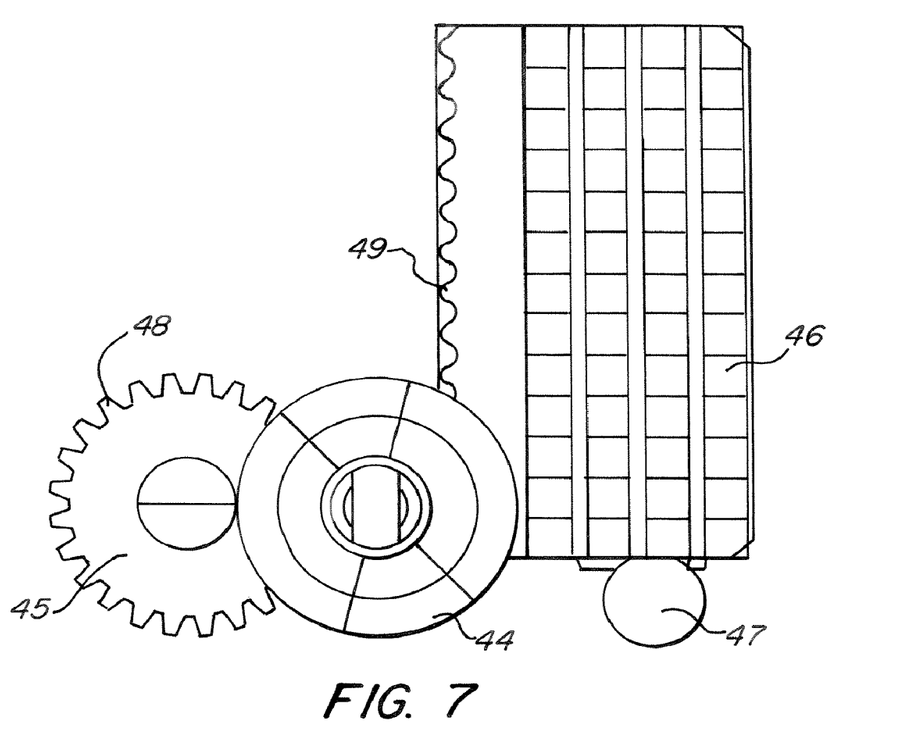
FIGS. 7 to 9 are schematic views of further alternative embodiments of the present invention.
Figure 8:
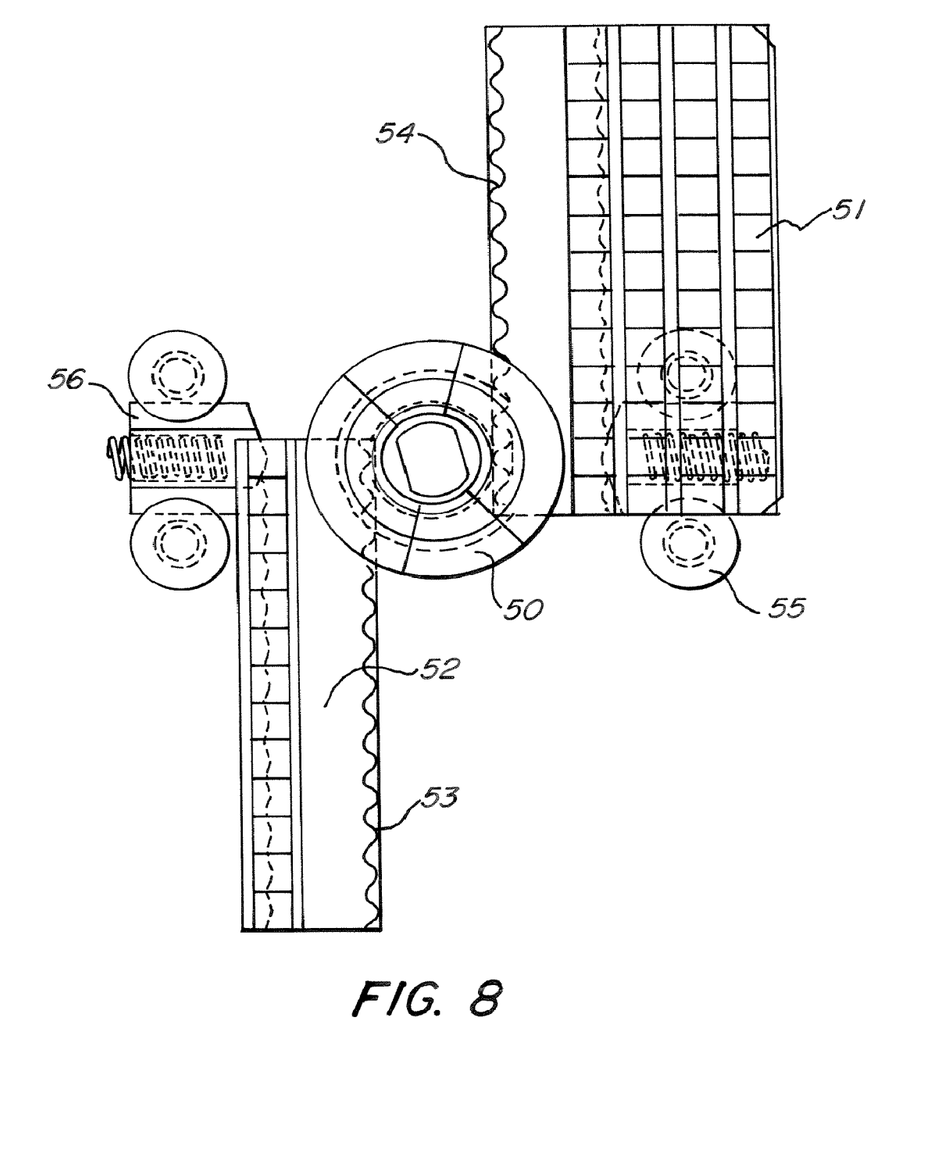
Figure 9:
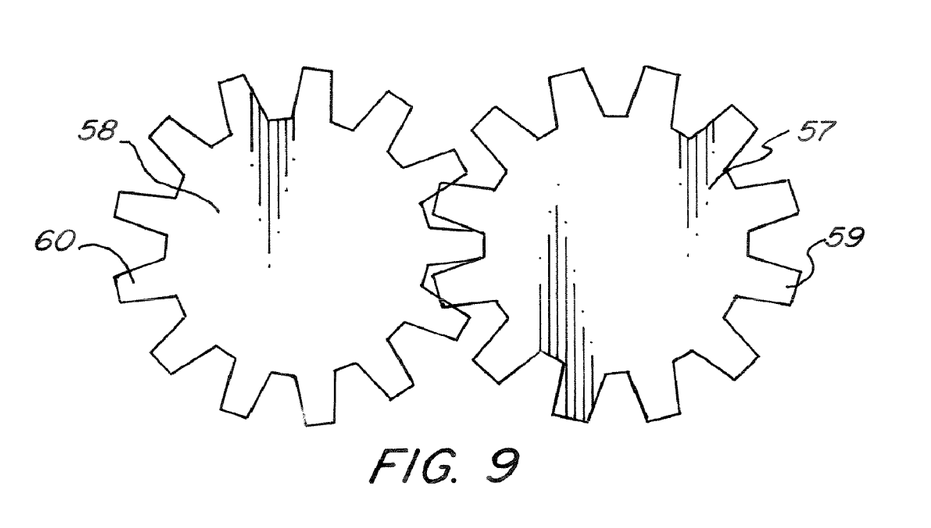

To simplify the description only the different code elements are shown in the FIGS. 7 to 9, but a person skilled in the art realises that the sensors also has detectors, PCB etc. in the same way as the embodiments described above. A person skilled in the art also realises that the number of code parts may exceed two. In the embodiments schematically shown in FIGS. 7 and 8 the sensor comprises three code elements.

In the embodiment of FIG. 7 a first code wheel 44 is attached to the adjustment shaft or is driven indirectly of the adjustment shaft. The first code wheel 44 is drivingly connected to a second code wheel 45 and a code rack 46. The second code wheel 45 has teeth 45 meshed with teeth (not shown) on the first code wheel 44. The number of teeth 45 of the first and second code wheels 44, 45 is such that the second code wheel 45 will rotate about half a turn for each turn of the first code wheel 44. Furthermore, the first code wheel 44 or the adjustment shaft is furnished with a finger to drive the code rack 46 intermittently, by means of teeth 49 of the code rack 46. The code rack 46 is moved one step for each turn of the first code wheel 44. Thus, the wear of the brake linings will be indicated of the positions of the three code elements 44, 45, 46. A guide wheel 47 of a guiding means to control the movement of the rack 46 in the same way as indicated above for other embodiments is shown in FIG. 7.

In FIG. 8 a further example of an embodiment according to the present invention is indicated. In this embodiment three code elements are used, which are one code wheel 50 and first and second code racks 51 and 52, respectively. Both the first and the second code rack 51, 52 have teeth 53, 54 facing the code wheel 50 and adjustment shaft. Furthermore, guiding means 55, 56 are arranged to control the movement of the racks 51, 52. The code wheel 50 is driven by means of the adjustment shaft. Often the code wheel 50 is attached directly to the adjustment shaft. The code wheel 50 or the adjustment shaft is furnished with a finger to drive the code racks 51, 52 intermittently. The finger goes into contact with the teeth 53, 54 of each code rack 51, 52 and will move each code rack 51, 52 one step for each turn of the code wheel 50. Also in this case the positions of the three code elements 50, 51, 52 indicate the wear of the brake linings. The racks 51, 52 are also furnished with guiding means 55, 56.

In the embodiment of FIG. 9 two code elements in the form of a first and second code wheel 57, 58 are used. The first code wheel 57 is driven by the adjustment shaft in the same way as for the other embodiments. The first code wheel 57 has teeth 59 meshing with teeth 60 of the second code wheel 58. In the shown embodiment the number of teeth 59 of the first code wheel 57 is 12, while the second code wheel 58 has 13 teeth 60. Thus, the second wheel 58 will not rotate a full turn for each turn of the first wheel 57. The exact number of teeth 59, 60 of the two wheels 57, 58 may vary. It is also possible to let the second code wheel 58 have a slightly higher number of teeth 60, in which case it obviously will rotate somewhat more than one turn for each turn of the first code wheel 57. In this case the code wheels 57, 58 are normally furnished with Graycode. Thus, the code is such that it does not repeat itself during the totally about 13 turns of the adjustment shaft and, thus the first code wheel 57. This is achieved in that the two code wheels 57, 58 are rotating with slightly different speeds. The two code wheels 57, 58 are rotating with different speeds and the codes are placed such that they will change all the time on both wheels 57, 58. It is the position of the two code wheels 57, 58 that indicate the wear of the brake linings.

As stated above it is possible to use different kinds of code elements and sensors. One further example is to have sliding contacts such as on mechanical encoders. The paths will then be placed at a wheel and rack in the same way as indicated above.

The PCB 14, 21, 30 of FIGS. 3 to 6 contains circuitry in the same way as described above for the example of FIGS. 1 and 2. Thus, the circuitry of the PCB 14, 21, 30 is used to control the respective sensor and to give appropriate warning to the driver.

When the lining material has been worn out and new brake pads are to be inserted, the adjuster mechanism is returned to a starting position. The starting position is adapted to the thickness of the new brake pads. The adjuster mechanism is normally returned by means of a reset shaft. Rotation of the reset shaft will also rotate the adjustment shaft. By the resetting of the adjuster mechanism the sensor element is automatically brought back to its starting position. Thus, no special calibration is normally needed after insertion of new brake pads.

However, it is also possible to calibrate the sensor by hand, in which case the sensor first has to be disassembled.

What is claimed is:

1. A digital sensor for monitoring wear of a lining material of disc brakes, which sensor is adapted to be attached at an end of an adjustment shaft of an adjusting mechanism for adjusting the position of brake pads in relation to a brake disc, which sensor comprises:
    a first code part, said first code part being rotated continuously by rotation of the adjustment shaft of the disc brake and comprising a code wheel, and
    a second code part, said second code part comprising a sliding part in the form of a code rack which is moved in a linear fashion;
    characterized in that the second code part is moved intermittently by the rotation of the adjustment shaft.

2. The sensor of claim 1, characterized in that the sensor further comprises detectors directed towards the code parts, a connection part of the first code part drivingly connected to the adjustment shaft of the disc brake, a printed circuit board, and that the code parts have code paths turned towards the detectors of the printed circuit board.

3. The sensor of claim 2, characterized in that a code on the code parts is formed by at least one of magnets, light and dark sectors, and presence or absence of holes.

4. The sensor of claim 3, characterized in that the detectors are received on the printed circuit board; that the printed circuit board has circuitry to relate signals from the detectors to the wear of the lining material of the brake; that the two code parts are arranged on one side of the printed circuit board or on opposite sides of the printed circuit board; and that a Graycode is used.

5. The sensor of claim 4, characterized in that the detectors comprise at least one of optical detectors, magnetic sensors and mechanical switches.

6. The sensor of claim 5, characterized in that the detectors are at least one of magnetoresistive sensors and hall effect sensors.

7. The sensor of claim 1, characterized in that the first code part or a part drivingly connected to the first code part, has a finger for co-operation with teeth of the second code part and that the finger is arranged to advance the second code part a distance corresponding to one tooth for each turn of the first code part.

8. The sensor of claim 6, characterized in that seven detectors are arranged on the printed circuit board for reading up to four different paths on the second code part.

9. The sensor of claim 7, characterized in that a part drivingly connected to the adjustment shaft or an extension of the adjustment shaft is received in a slot of the second code part.

10. The sensor of claim 6, characterized in that the sensor further comprises a third code part.

11. The sensor of claim 10, characterized in that the three code parts are two code wheels and one code rack.

12. The sensor of claim 10, characterized in that the three code parts are one code wheel and two code racks.

13. The sensor of claim 6, characterized in that the sensor comprises two code wheels.

14. The sensor of claim 7, characterized in that a clamp is biased by means of a spring against teeth of the second code part.

15. A digital sensor for monitoring wear of a lining material of disc brakes comprising:
    a first code part attached at an end of a disc brake adjustment shaft of an adjusting mechanism that adjusts the position of brake pads in relation to a brake disc; said first code part being rotated by rotation of the disc brake adjustment shaft; and
    a second code part having a sliding part in the form of a code rack which is moved in a linear fashion by said first code part;
    characterized in that the second code part is moved intermittently by the rotation of the adjustment shaft.

16. The digital sensor according to claim 15 wherein said first code part comprises a protrusion that engages with said second code part to move said second code part.

* * * * *